Feb. 18, 1947.　　　F. H. OSBORNE　　　2,416,210
FILM SELECTING MECHANISM
Filed March 13, 1944

Inventor,
Fred H. Osborne,
by Walter P. Geyer
Attorney.

Patented Feb. 18, 1947

2,416,210

UNITED STATES PATENT OFFICE 2,416,210

FILM SELECTING MECHANISM

Fred H. Osborne, Snyder, N. Y., assignor to The Rudolph Wurlitzer Company, North Tonawanda, N. Y., a corporation of Ohio Application March 13, 1944, Serial No. 526,300

3 Claims. (Cl. 242—55)

1

This invention relates generally to a selector mechanism but more particularly to a film selector for automatically selecting, at the will of a patron, a given portion or selection of a film on a magazine reel of the type used on film projectors.

It has for one of its objects to provide a selector mechanism of this character which is so designed as to selectively and automatically control the movement of the film to render operative one or another of a plurality of portions or selections thereon as predetermined by a selection made by the patron, it being understood that the film is divided into different subjects or selections and that appropriately identified selector elements or buttons are provided for manual selection by the patron.

Another object is to provide an electrically-governed film selector mechanism which is automatically operative to propel the film in one direction or the other to its preselective position, the film having means thereon correlated with such mechanism for controlling the initiation as well as the termination of movement of the film to and from a selection-rendering position.

Other features of the invention reside in the construction and arrangement of parts hereinafter described and particularly pointed out in the appended claims.

Figure 1:
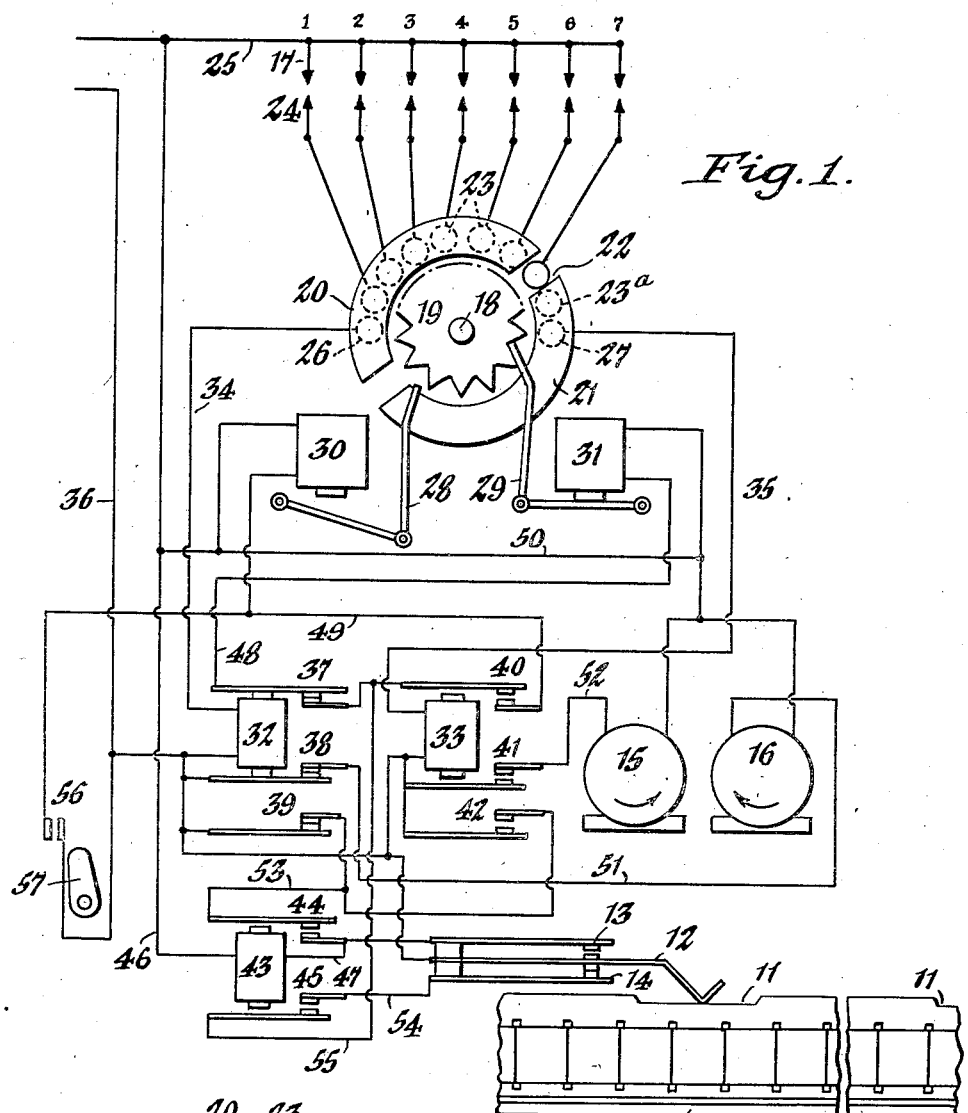
Figure 2:
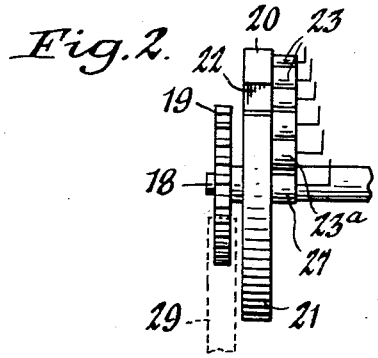

In the accompanying drawings:

Figure 1 is a diagrammatic view of the film selector mechanism embodying my invention. Figure 2 is an end view of the segmental brushes and associated parts.

Similar characters of reference indicate corresponding parts throughout the several views.

Referring now to the drawings, 10 indicates a portion of a film, such as is used on projection machines, which is divided into a plurality of different subjects or selections adapted to be automatically selected by my selector mechanism and which is provided along one edge thereof between the selections with notches 11. The movable element 12 of a pair of alternately opening and closing switches 13, 14 is normally yieldingly urged for displacement into the film-notches as they travel past the same to effect the closing of the switch 14 and the opening of the switch 13. During the operative showing or playing of the film, the switch element 12 engages the edge of the film to maintain the switch 13 closed and the companion switch 14 open, these switches in part controlling the automatic operation of the mechanism as will hereinafter appear.

2

The numerals 15, 16 indicate a pair of electric motors, rotatable in opposite directions, and which serve to drive the reels to which the opposite ends of the film 10 are connected in corresponding directions to thereby propel the film to a pre-set position, corresponding to the selection thereon, which the patron has selected. Push buttons 17, bearing numbers or like characters, are provided which are adapted to be depressed to a selective position by the patron, there being seven of such buttons shown in the drawings, by way of example, corresponding to a like number of selections on the film.

The selector mechanism is preferably constructed as follows:

Mounted for rotation in one direction or the other on a shaft 18 is a ratchet wheel 19 to which is connected a pair of segmental brushes 20, 21, which are substantially semi-circular in shape and spaced at their opposing edges to provide diametrically opposed gaps 22 wide enough to clear one contact of a semi-circular row of selector contacts 23 disposed in contacting or circuit-closing relation with one or the other of such brushes. These selector contacts correspond in number to the selector buttons 17 which control companion selector switches 24, one terminal of each switch being connected to a feed wire 25 and the other terminal thereof being connected to the companion contact 23. The brush 20 is in constant electrical connection with a contact 26 while the brush 21 is in like connection with a contact 27. Cooperating with the ratchet wheel to intermittently advance it step by step in one direction or the other to selectively position the brushes in position corresponding to the push button depressed, and which position is that wherein the gap 22 registers with that contact 23 companion to the button selected, a pair of feed pawls 28, 29 is provided and adapted to be rendered operative upon the energization of companion electromagnets 30, 31, respectively. The energization of the electromagnet 30 causes the ratchet to be advanced one tooth in a clockwise direction, while the energization of the electromagnet 31 causes the ratchet to be advanced one tooth in a counter-clockwise direction, and it might be stated here that simultaneously with the closing of the circuits including those electromagnets, circuits are established for rendering the respective film-driving motors 15 and 16 operative to propel the film in one direction or the other until the selected subject is in position for projection.

The numerals 32, 33 indicate relays, one having its coil connected by a wire 34 with the segment-contact 26 and the other by a wire 35 with the companion segment-contact 27, while the other ends of these relay-coils are connected by branch wires to the other or return feed wire 36 of the power line. The relay 32 has three sets of contact points 37, 38 and 39, and the relay 33 has a like number of contact points 40, 41 and 42. A third relay 43 is provided having two sets of contact points 44, 45 with the coil thereof connected by a wire 46 with the feed wire 25 and by a wire 47 with the blade of the switch 13, so that whenever the latter is closed the relay is energized and its contact points closed. The relay contact points 37 and 40 serve, when the relays are energized, to close the circuits of the respective electromagnets 31 and 30, the point 37 being connected by a wire 48 with the coil of its controlling magnet 31, and the point 40 being connected by a wire 49 with its controlling magnet 30, both magnets being also connected to a common wire 50 joined to the wire 46 leading from the feed wire 25. The contact points 38 and 41 of the respective relays 32, 33 are included in the control circuits of the motors 16 and 15, respectively, through the medium of wires 51 and 52 connected to one terminal of the motors, the other terminals thereof being connected to the common wire 50 included in the circuit of the electromagnets 30, 31. The relay contact points 39 and 42 control a circuit through the contact point 44 of the relay 43, each being connected at one end to a common wire 53 leading to said contact point 44 and at its other end to the coils of the respective relays 32 and 33. The other end of the contact point 44 is connected jointly to the blade of the switch 13 and to the coil of its relay 43 by the wire 47. The other contact point 45 of said relay 43 is connected at one end by a wire 54 with the blade of the film control switch 14 and at its other end by a wire 55 in circuit with the contact points 37 and 40 of the respective relays 32 and 33.

The electromagnet 30 is also included in another circuit for advancing the ratchet 19 on step clockwise at a predetermined time in the cycle of operations and for this purpose a switch 56 is provided which is normally open and adapted to be closed by a cam 57 actuated in any suitable manner by the film projecting apparatus at the end of play of a given selection on the film. Thus, at the end of play of a selection, the switch 56 is closed and the ratchet advanced one tooth to bring the circuit-breaking brush gap 22 in register with the next adjoining or higher numbered selector contact 23, which corresponds to the beginning of the next selection and is also the end of the selection just played or projected. Beyond the last or 7th selector contact is a false contact 23$^a$ with which the gap registers when the brushes 20, 21 are moved beyond such last or 7th contact.

The operation of the selector mechanism is as follows:

Assume that selector button "6" was last selected and the corresponding selection on the film 10 projected and completed, and the movable switch element 12 in register with the film-notch 11 at the end of that selection and the beginning of the next selection and wherein the switch 13 is open and the switch 14 is closed. Assume also, that a selection of a lower number, say "4," was selected by the patron depressing the companion push button 17. The relay 32 is thereupon energized, the circuit being from the feed wire 25, push button switch 24 and companion selector contact 23, segmental brush 20, contact 26, wire 34 to the relay coil and thence to the return feed wire 36, causing the closing of its respective contact points 37, 38 and 39. This circuit is maintained until the brush-gap 22 registers with the number "4" selector contact 23. A circuit is simultaneously established through the motor 16 to start winding the film in a direction to move it from selection number "6," just completed, to number "4" selection, the circuit including feed wire 36, contact points 38, and wire 51 to the motor and from the motor through wires 50 and 46 to the other feed wire 25. The closing of the contact points 39 establishes a circuit through the contact points 44 of the relay 43. As the film starts to move, the switch element 12 is moved out of the film-notch to cause the closing of the switch 13 and the opening of the switch 14 and complete the circuit through the relay 43 to close its points 44 and 45. The closing of the points 44 locks such relay, the circuit being from feed wire 25, wire 46, relay 43, wire 47, contact points 44, wire 52, and contact points 39 to the return feed wire 36. As the end of the following selection number "5" is reached, the switch element 12 drops into the corresponding film-notch 11 which again opens switch 13 and closes switch 14 and a circuit is established to energize the electromagnet 31 and move the ratchet wheel 19 one step in a counter-clockwise direction, shifting the brush-gap 22 from the selector contact 23 corresponding to the selection "6" to that corresponding to the selection "5." This circuit is from feed wire 25, wires 46 and 50 to electromagnet 31, wire 48 to relay contact points 37, wire 55, relay contact points 45, switch 14 and thence to return feed wire 36. Inasmuch as the selector contact corresponding to selection "4" is still closed, the relay 32 remains energized and the cycle is repeated, not being completed until the brush-gap registers with the selection "4" contact, at which time the relay circuit is opened to break its contact points 37, 38 and 39, the film-governed switches 13, 14 are opened and closed, respectively, and the relay 43 is thereupon de-energized and its contact points 44, 45 broken. During the cycle described the film has been moved from the terminal end of selection "6" to its beginning, then to the beginning of selection "5" and finally to the beginning of the chosen selection "4." Thereupon, the film projecting apparatus is set in motion by any suitable means and the film advanced to the end of selection "4" and to the beginning of selection "5." At the end of the projection of that selection, the cam 57 is adapted to be actuated by the projector to close the switch 56 and effect the energization of the electromagnet 30 to move the brushes 20, 21 one step clockwise to the next higher numbered selector contact 23, or in this instance, to the contact corresponding to selector button "5" to bring the brush-gap 22 into register therewith. Should push button "7" be thereafter selected, then the circuits governed by the electromagnet 33 are rendered operative to start the motor 15 and advance the film accordingly in the opposite direction. At the end of each selection movement of the film and until the chosen selection is reached, the electromagnet 30 is energized to move the ratchet 19 and its brushes 20, 21 clockwise in step by step fashion until the gap 22 registers with the contact 23 companion to the push button "7," when the circuits are opened in the manner previously described.

I claim as my invention:

1. A film selecting mechanism, comprising electric drive means for moving the film in one direction or the other to present a given selection thereon for projection, a row of selector contacts corresponding in number to the selections on the film and having selector switches connected thereto, a movable brush disposed for selective circuit-closing engagement with said selector contacts and having a circuit-opening gap therein registrable successively with one or another of such contacts, a circuit including such parts, and electrical devices in said circuit and responsive to the closing of a selector switch for simultaneously rendering the film-driving means operative until such time as the brush-gap registers with the selector contact corresponding to the selector switch selected and for intermittently moving said brush a predetermined distance at each interval of selective movement of the film, said circuit including a switch in governing relation to the film and movable thereby to one or the other of two positions for rendering the circuit operative to advance the brush a given distance in one position of the switch and inoperative to advance the brush in its other position.

2. A selecting mechanism for films having a plurality of selections thereon and having switch-controlling elements at points separating those selections, comprising electric drive means for moving the film in one direction or the other to present a given selection thereon for projection, a row of selector contacts corresponding in number to the selections on the film and having patron-actuated selector switches connected thereto, a movable brush disposed for contacting engagement with said selector contacts and having a circuit-breaking gap therein registrable with one or another of such contacts in a selection-rendering position, electrically-actuated feed means connected to said brush for moving the same intermittently during a selecting cycle until its circuit-breaking gap registers with the selector contact companion to the chosen selector switch, electrically-governed devices responsive to the closing of a selector switch for simultaneously rendering said film-driving means and said brush feed means operative until such time as the brush-gap registers with the selector contact corresponding to the selector switch selected, and a film-governed switch included in the circuit of the brush feed means for rendering such circuit operative to actuate such means to advance the brush a given distance upon registration of said switch with the controlling elements on the film and inoperative during the travel of the selection portion of the film between such elements.

3. A selecting mechanism for films having a plurality of selections thereon and having switch-controlling elements at points separating those selections, comprising electric drive means for moving the film in one direction or the other to present a given selection thereon for projection, a row of selector contacts corresponding in number to the selections on the film and having patron-actuated selector switches connected thereto, a movable brush disposed for contacting engagement with said selector contacts and having a circuit-breaking gap therein registrable with one or another of such contacts in a selection-rendering position, electrically-actuated feed means connected to said brush for moving the same intermittently during a selecting cycle until its circuit-breaking gap registers with the selector contact companion to the chosen selector switch, electrically-governed devices responsive to the closing of a selector switch for simultaneously rendering said film-driving means and said brush feed means operative until such time as the brush-gap register with the selector contact corresponding to the selector switch selected, a film-governed switch included in the circuit of the brush feed means for rendering such circuit operative to actuate such means to advance the brush a given distance upon registration of said switch with the controlling elements on the film and inoperative during the travel of the selection portions of the film between such elements, and means rendered operative at the end of the projection of a selection and operatively connected to said brush feed means for actuating it one step to bring the brush-gap out of register with the companion selector contact and into register with the next adjoining contact.

FRED H. OSBORNE.

REFERENCES CITED

The following references are of record in the file of this patent:

UNITED STATES PATENTS

| Number | Name | Date |
| --- | --- | --- |
| 2,002,352 | Owens | May 21, 1935 |
| 2,269,952 | Morgan | Jan. 13, 1942 |
| 2,322,489 | Von Madaler | June 22, 1943 |
| 2,330,036 | Eakins | Sept. 21, 1943 |
| 2,345,869 | Edwards | Apr. 4, 1944 |
| 2,008,876 | Rehder | July 23, 1935 |
| 1,950,692 | Owens | Mar. 13, 1934 |
| 2,352,077 | Clough | June 20, 1944 |